3,482,021
ANTI-PHLOGISTIC AND ANALGESIC COMPOSITIONS AND METHODS FOR RELIEVING INFLAMMATORY CONDITIONS
Richard H. Gosling, Butley, near Prestbury, England, assignor to Geigy Chemical Corporation, Greenburgh, N.Y., a corporation of Delaware
No Drawing. Filed Aug. 10, 1965, Ser. No. 478,733
Claims priority, application Great Britain, July 1, 1965, 27,929/65
Int. Cl. A61n 27/00
U.S. Cl. 424—273                                    3 Claims

ABSTRACT OF THE DISCLOSURE

Compositions containing (a) phenylbutazone or oxyphenbutazone and (b) p-hydroxyacetanilide are synergistically effective in treating inflammatory conditions. Methods for alleviating inflammatory conditions and for potentiating the effect of phenylbutazone and oxyphenbutazone use these compositions.

---

This invention relates to antiphlogistic-analgesic compositions suitable for administration to patients suffering from inflammatory conditions. More particularly, it is concerned with synergistic compositions comprising (a) phenylbutazone or oxyphenbutazone and (b) p-hydroxyacetanilide.

It is a matter of common knowledge and experience that phenylbutazone and its metabolite oxyphenbutazone, are of remarkable use in the treatment of inflammatory conditions in mammals, particularly humans (Merck Index, 7th edition, page 800, 1960). It is also known that the use of phenylbutazone or of oxyphenbutazone is accompanied in some instances by undesirable side effects, among which can be mentioned oedema, nausea, vomiting, diarrhea, constipation, activation of peptic ulcer with bleeding, and the like. Because of this, the physician or veterinarian must use these valuable drugs with caution. In some instances, this has required reducing the amount of these drugs which can be safely administered to a daily dosage level below which they are uniformly effective. Accordingly, it is most desirable to provide a means to use phenylbutazone or oxyphenbutazone at thereapeutically effective levels with a minimum of accompanying side effects. Such an advantage now is provided by use of the compositions and methods of the instant invention.

It has now been found that p-hydroxyacetanilide potentiates the effectivemess of phenylbutazone and its metabolite. While the reason for this is not clearly understood at this time, it is observed that the new compositions provide remarkable and unexpected anti-inflammatory and antiphlogistic activity at phenylbutazone levels of only one-tenth of those ordinarily used, permitting the control and relief of inflammatory conditions with a very significant freedom from the above mentioned side effects.

According to the present invention, there is provided a pharmaceutical composition comprising a physiologically acceptable carrier or diluent, phenylbutazone or oxyphenbutazone, and a proportion of p-hydroxy-acetanilide sufficient to enhance the antiphlogistic activity of the phenylbutazone or oxyphenbutazone.

The p-hydroxy-acetanilide is preferably present in the composition of the invention in a proportion in the range of from about 5 to about 15 parts by weight of p-hydroxyacetanilide per part by weight of the phenylbutazone or oxyphenbutazone. A composition of the invention comprising about 10 parts by weight of p-hydroxy-acetanilide per part by weight of the phenylbutazone has been found to be particularly valuable in the treatment of inflammatory conditions.

In a specific embodiment of the invention, there is provided a pharmaceutical composition in dosage unit form comprising a physiologically acceptable carrier, phenylbutazone or oxyphenbutazone, and from about 5 to about 15 parts by weight, and especially about 10 parts by weight, of p-hydroxy-acetanilide per part by weight of the phenylbutazone or oxyphenbutazone.

An important further embodiment of the instant invention is a method for alleviating inflammatory conditions which comprises administering to a host an effective amount of a pharmaceutical composition of the invention. This is in essence, a method for alleviating inflammatory conditions which comprises administering to a host an effective amount of a composition comprising (a) phenylbutazone or oxyphenbutazone and (b) from about 5 to about 15, and especially about 10, parts of p-hydroxyacetanilide per part by weight of said phenylbutazone or oxyphenbutazone.

Still another valuable embodiment of the instant invention comprises a method for potentiating the effects of phenylbutazone or oxyphenbutazone which consists in administering the phenylbutazone or oxyphenbutazone in admixture with p-hydroxyacetanilide, said p-hydroxyacetanilide being present in an amount to provide from about 5 to about 15, and especially about 10, parts by weight per part by weight of said phenylbutazone or oxyphenbutazone.

The compound p-hydroxyacetanilide is a drug well known for its analgesic and antipyretic properties, and it is widely available (Merck Index, 7th edition, page 537, 1960). The compounds phenylbutazone, also known as 4-butyl - 1,2 - diphenyl - 3,5 - pyrazolidinedione (U.S. 2,562,830) and oxyphenbutazone, also known as 4-butyl-1-phenyl-2-(p - hydroxyphenyl) - 3,5 - pyrazolidinedione (U.S. 2,745,783), are both known and widely used as analgesics, antipyretics, anti-inflammatories, and uricosuric agents for gout, rheumatoid arthritis, acute bursitis and thrombophlebitis.

The term "host" when used herein and in the appended claims contemplates animals broadly, particularly mammals, and especially humans. The term "inflammatory conditions" contemplates diseases or other pathological conditions of animals which are commonly alleviated by treatment with antiphlogistic (anti-inflammatory) agents. Illustrative conditions alleviated through practice of the instant invention include: rheumatoid arthritis, osteoarthritis, disc lesions, brachial neuritis, superficial thrombophlebitis, fibrositis, low back strain, tendosynovitis, muscular rheumatism, sacroiliac strain, cervical spondylosis, tennis elbow, dysmenorrhea, and the like.

The instant compositions are well tolerated by the patient. Their use is accompanied by a quick onset of action and a long lasting analgesic effect. This, in combination with their antipyretic and enhanced antiphlogistic properties makes them useful against a broad spectrum of diseases.

Although pharmaceutical compositions comprising phenylbutazone and a second analgesic such as aminopyrine are known, the instant compositions comprising phenylbutazone or oxyphenbutazone and the analgesic, p-hydroxy-acetanilide, are new and posses a completely unexpected degree of activity. There is observed a synergism between the components with respect to the antiphlogistic effect of phenylbutazone, but no increase at all in the common and undesirable side effects. Thus for the first time there is provided a composition in which the antiphlogistic properties of phenylbutazone have been potentiated to the extent that clinical control of adult human inflammatory diseases can be obtained with only 150–200 mg. per day in contrast to normal maintenance daily dosages of 300–600 mg.

These clinical data from hundreds of patients, which show the synergistic effect of p-hydroxyacetanilide on phenylbutazone have a quantitative basis in pre-clinical animal studies. One well known test for anti-inflammatory activity is the formalin peritonitis test referred to be G. Wilhelmi, Excerpta Med. Internat. Congr. 82,174 (1964).

In this test, exudative peritonitis in rats is induced by the intraperitoneal injection of 1 ml. of a 1% formaldehyde solution into each test animal. The preparations under test were given per os 60 minutes prior to the injection of the formaldehyde. The animals are sacrificed 8 hours after the injection of the formaldehyde. The abdomen is opened, the exudate which has formed is allowed to drop out. Then the quantity of the exudate is determined. It is known that certain agents decrease the formation of exudate, and this decrease is directly related to their anti-inflammatory activity. Thus to determine wheter a compound has anti-inflammatory activity in this test, it is administered to the animal and then the amount of exudate is determined and compared against the amount obtained from a control animal. It is found that the amount of exudate obtained from animals treated with anti-inflammatory and antiphlogistically active compounds is substantially less than that obtained from animals not so treated.

In the formalin peritonitis test, p-hydroxyacetanilide alone administered to the test animal at 200 mg./kg. of body weight showed a decrease of exudate of 28%, a non-effective level, and phenylbutazone administered alone at 200 mg./kg. caused a decrease in exudate of 63%, a most effective level. Administration of 200 mg./kg. of a composition comprising 18 mg. of phenylbutazone and 182 mg. of p-hydroxyacetanilide caused a decrease of exudate of 55% which is unexpected and remarkable in view of the fact that only about one tenth as much of phenylbutazone was administered.

The lack of any undesirable potentiation of the toxicity of phenylbutazone upon the addition of p-hydroxyacetanilide is shown by the following data: the $LD_{50}$ orally in the rat is, respectively, 493 mg./kg. for phenylbutazone; 3700 mg./kg. for p-hydroxyacetanilide and 2550 mg./kg. for the composition comprising phenylbutazone and p-hydroxyacetanilide in a weight ratio of about 1:10. Thus, antiphlogistic activity has been increased to a remarkable extent, as shown above, but toxicity has not been affected.

The daily dosages for the compositions of the invention vary between about 1000 and 3000, and preferably 1500 to 2500 mg. for adult individuals. Of this daily dosage, the amount of phenylbutazone or oxyphenbutazone is preferably of the order of about 1 part by weight for each 10 parts by weight of p-hydroxyacetanilide. Suitable dosage units such as tablets, press coated tablets, capsules, or suppositories preferably contain from about 25 to about 100, and preferably about 50 mg. of phenylbutazone or oxyphenbutazone and from about 250 to 1000 mg. of p-hydroxyacetanilide. An especially preferred unit dosage from for administration to humans is a press coated oral tablet containing 50 mg. of phenylbutazone and 500 mg. of p-hydroxyacetanilide. Administration of three to four tablets daily of this composition to hundreds of adult human patients caused excellent response to acute inflammatory diseases, with side effects noted in relatively few.

To produce dosage units for peroral application, the compositions of this invention may be combined, e.g. with solid pharmaceutically acceptable pulverulent carriers such as lactose, saccharose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights, to form tablets or press coated tablets. The latter are coated for example, with concentrated sugar solutions which can contain e.g. gum arabic, talcum and/or titanium dioxide, or they are coated with a lacquer dissolved in easily volatile organic solvents or a mixture of organic solvents. Dyestuffs can be added to these coatings, for examples, to distinguish between different contents of active substance.

Hard gelatin capsules contain, for example, granulates of the instant compositions with solid, pulverulent carriers such as, e.g. lactose, saccharose, sorbitol, mannitol, and further starches such as potato starch, corn starch or amylopectin, cellulose derivatives or gelatin, as well as magnesium stearate or stearic acid.

Such tablets and capsules contain preferably between about 450 and about 650 mg. of the instant compositions, said amounts constituting from 25 to 90 and preferably about 40 to about 80% of the total weight of the tablets and capsules respectively.

Suppositories containing the compositions of the present invention are readily obtained by techniques well known to those skilled in the art of compound dosage forms. For example, phenylbutazone or oxyphenbutazone can be mixed with an appropriate amount of p-hydroxyacetanilide then dispersed in a carrier such as cocoa butter and the suppositories formed in the usual way.

The following examples are given by way of illustrating the compositions and methods of the instant invention. They are not to be construed as limiting the scope thereof in any way.

EXAMPLE 1

Manufacture of tablets 50.0 g. of phenylbutazone, 500.0 g. of p-hydroxyacetanilide, 24.0 g. of highly dispersed silicic acid and 110.1 g. of corn or potato starch are well mixed and the mixture is uniformly moistened with a solution of 35.0 g. of gelatine, 20.0 g. of glycerin and 0.9 g. of sodium metabisulphite in 200 ml. of demineralized water. The resulting mass is granulated through a sieve and dried to a water content of 1.9–2.1% (absolute). The dry granulate is mixed with 60.0 g. of potato or corn starch, 6.0 g. of highly dispersed silicic acid, 60.0 g. of talcum and 4.0 of magnesium stearate and the mixture is pressed into 1000 tablets each containing 50 mg. of phenylbutazone and 500 mg. of p-hydroxyacetanilide.

EXAMPLE 2

Manufacture of press coated tablets (a) For the preparation of the core 50.00 g. of phenylbutazone, 61.00 g. of dried corn or potato starch, 37.00 g. of lactose and 3.00 g. of highly dispersed silicic acid are well mixed and the mixture is uniformly moistened with a solution of 6.00 g. of gelatine and 4.00 g. of glycerin in approx. 55 ml. of demineralized water. The mass obtained is granulated through a sieve and dried to a water content of 1.9–2.1% (absolute). The dry granulate is mixed with 10.00 g. of dried corn or potato starch, 8.00 g. of talcum and 1.00 g. of magnesium stearate and the mixture is pressed into 1000 tablet cores each weighing 180 mg.

(b) A second granulate is prepared by uniformly moistening 500.00 g. of p-hydroxyacetanilide with a solution of 20.00 g. of gelatine and 15.00 g. of glycerin in approx. 200 ml. of demineralized water. This is followed by granulating and drying. This granulate is mixed with 27.00 g. of corn or potato starch, 30.00 g. of talcum, 5.00 g. of highly dispersed silicic acid and 3.00 g. of magnesium stearate. The tablet cores produced according to (a) are coated in a special tablet machine with the mixture obtained. In this way 1000 press coated tablets each weighing 780 mg. and each containing 50 mg. of phenylbutazone and 500 mg. of p-hydroxyacetanilide are produced.

EXAMPLE 3

Manufacture of suppositories 150.00 g. of phenylbutazone and 750.00 g. of p-hydroxyacetanilide are well mixed and homogeneously suspended in the amount of cocoa butter needed to make up a total quantity of 2000 ml. and which contain 0.05 g. of dissolved o-tert.-butyl-p-cresol. From this 1000 suppositories each weighing 2.0 ml. and each containing 150 mg. of phenylbutazone and 750 mg. of p-hydroxyacetanilide, are formed. Similarly, 2 ml. suppositories containing 50 mg. of phenylbutazone and 750 mg. of p-hydroxyacetanilide, useful in accordance with the present invention, are prepared, by substituting appropriate quantities of the active ingredients.

EXAMPLE 4

The procedures of Examples 1, 2 and 3 are used substituting for the phenylbutazone an equal weight of oxyphenbutazone, to prepare tablets and suppositories containing, (a) oxyphenbutazone and, respectively, (b) 10, 10, 5 and 15 parts of p-hydroxyacetanilide per part by weight of said oxyphenbutazone. These compositions are useful in controlling inflammatory conditions.

What is claimed is:

1. A pharmaceutical composition in dosage unit form comprising a pharmaceutically acceptable carrier and (a) phenylbutazone and (b) about 10 parts of p-hydroxyacetanilide per part by weight of said phenylbutazone.

2. A method of alleviating inflammatory conditions which comprises administering to a host an effective amount of a composition comprising (a) phenylbutazone and (b) about 10 parts of para-hydroxyacetanilide per part by weight of said phenylbutazone.

3. A method for potentiating the effect of phenylbutazone which consists in orally administering to a host the phenylbutazone in admixture with p-hydroxyacetanilide, said p-hydroxyacetanilide being present in an amount to provide about 10 parts per part by weight of said phenylbutazone.

References Cited

Breugelmans et al., J. Pharm. Belg. 11, 309–37 (1956), as cited in C.A. 51, 8363f (1967).

The Merck Index, 7th edition, pp. 537–538, 800–801 (1960).

American Drug Index for 1963, p. 144 (1963).

New and Nonofficial Drugs for 1963, pp. 395–399 (1963).

FRANK CACCIAPAGLIA, Jr., Primary Examiner

U.S. Cl. X.R.

424—324